United States Patent [19]

Imran

[11] Patent Number: 4,667,328
[45] Date of Patent: May 19, 1987

[54] CLOCKING CIRCUIT WITH BACK-UP CLOCK SOURCE

[75] Inventor: Mir Imran, Gibsonia, Pa.

[73] Assignee: Mieczyslaw Mirowski, Owings Mills, Md.

[21] Appl. No.: 728,050

[22] Filed: Apr. 29, 1985

[51] Int. Cl.[4] ............................................. G06F 11/20
[52] U.S. Cl. .................................. 371/61; 324/78 E; 371/8
[58] Field of Search ................... 371/61, 8; 324/78 E; 307/269, 480

[56] References Cited

U.S. PATENT DOCUMENTS

| | | | |
|---|---|---|---|
| 3,689,778 | 9/1972 | Sharp | 324/78 E |
| 3,694,744 | 9/1972 | Kalotay | 324/78 E |
| 3,803,568 | 4/1974 | Higashide | 371/61 X |
| 3,839,673 | 10/1974 | Acker | 324/78 E |
| 4,322,580 | 3/1982 | Khan et al. | 371/61 X |
| 4,362,957 | 12/1982 | Stern | 371/61 X |
| 4,538,272 | 8/1985 | Edwards et al. | 371/61 |

*Primary Examiner*—Charles E. Atkinson
*Attorney, Agent, or Firm*—Fleit, Jacobson, Cohn & Price

[57] ABSTRACT

A clocking system for providing periodic clocking or timing signals for use in an electronic circuit. The system includes a primary clock source, such as a crystal oscillator, that provides periodic clocking or timing signals at a predetermined frequency, and a back-up clock source that is similarly capable of providing periodic clocking or timing signals at the same predetermined frequency. The clocking signals of the primary source are monitored by a fault detecting circuit, such as a frequency monitoring circuit, which checks if the clock signals are occurring precisely at the predetermined frequency. If the frequency monitoring cirucit detects a frequency variation, or deviation, in the primary clocking source, a back-up clocking source is enabled which provides the clocking signals to the clock output terminal.

7 Claims, 4 Drawing Figures

CLOCKING CIRCUIT WITH BACK-UP CLOCK SOURCE

BACKGROUND OF THE INVENTION

The present invention relates to a clocking circuit for providing periodic clocking or timing signals in an electronic circuit. The invention includes a primary clock source and a back-up clock source, the latter of which is enabled to provide clocking signals upon detection of a fault in the primary clock source.

Modern electronic circuits, particularly those used in connection with microprocessor-based systems, typically require accurate clocking, or timing, signals that are used to synchronize the various electronic functions of the circuit. Generally, a single master clock source, such as a clock oscillator, is employed to provide a periodic clocking signal at a single frequency. This clocking signal can be divided by various numerical values to result in a plurality of separate clock signals, all of which are at a fraction of the master clock signal for uses at various portions of the circuit.

Accurate clock signals are essential for a proper functioning of the electronic circuit. If the frequency of the master clock signal deviates from its predetermined clock frequency, the circuit will not perform in the manner as intended.

Thus, a need exists for a system that monitors and checks the master clock oscillator to determine if the frequency of the clocking signals deviates from its predetermined clock frequency and to compensate for such deviation if it exists. This need is particularly important in those working environments that impose a greater risk of oscillator faults. For example, electronic circuits that are implantable in the human body, such as pacers, cardioverters, or defibrillators impose a risk of seepage of body fluids into the circuitry housing which could adversely affect the integrity of the clock oscillator. In such environments, accurate monitoring of the clocking signals becomes particularly important.

SUMMARY OF THE INVENTION

The present invention relates to a clocking system for providing clocking or timing signals for use in an electronic circuit. The system includes a primary clock source, such as a crystal oscillator, that provides periodic clocking or timing signals at a predetermined frequency, and a back-up clock source, such as an RC oscillator, that is similarly capable of providing periodic clocking or timing signals at the predetermined frequency. The primary clock source provides the clock signals to a clock output terminal. The clock signals are monitored by a fault detecting circuit, which checks if the clock signals are occurring at the predetermined frequency. The fault detecting circuit may comprise a frequency monitoring circuit which checks the frequency of the clocking signals. If the frequency deviates from the predetermined frequency, i.e., the frequency is higher or lower than the predetermined frequency, the fault detecting circuit disconnects the primary clock source from, and couples the back-up oscillator to, the clock output terminal. Preferably the back-up source is in a normally disabled state and is enabled upon detection of a failure in the primary source.

The clocking system of the present invention further provides the ability to enable a communication source, such as a telemetry link, to communicate when the back-up clock source has been enabled. Implantable medical devices, such as the implantable defibrillator/cardioverter as disclosed in co-pending U.S. patent application Ser. No. 478,038, filed on Mar. 23, 2983, and assigned to the same assignee as the instant application, typically includes a telemetry system for communicating various information from the implanted device to an external monitor. The present invention enables such telemetry system to communicate externally with the body when the primary clock source is in a fault condition.

Thus, it is an object of the present invention to provide an accurate, reliable, clocking system for an electronic circuit that requires periodic timing signals. It is an object of the present invention to provide a clocking system that includes both a primary and back-up clock source and a fault detecting circuit that, in response to frequency deviations of the primary clocking source, disables the primary source and couples the back-up source to a clock output terminal. Preferably the fault detecting circuit is a frequency monitoring circuit that detects if the frequency of the primary clocking signals is above or below the predetermined frequency. Moreover, the frequency monitoring circuit is a passive circuit, i.e. does not require receipt of accurate clocking signals for proper operation.

Still further, is an object of the present invention to provide a system for enabling an independent communication link, in response to the detection of an oscillator fault condition, so as to communicate such fault condition to an external monitor or detector.

These and other objects of the invention shall become apparent when reference is made to the following detailed description and drawings.

DETAILED DESCRIPTION OF A PREFERRED EMBODIMENT

Figure 1:
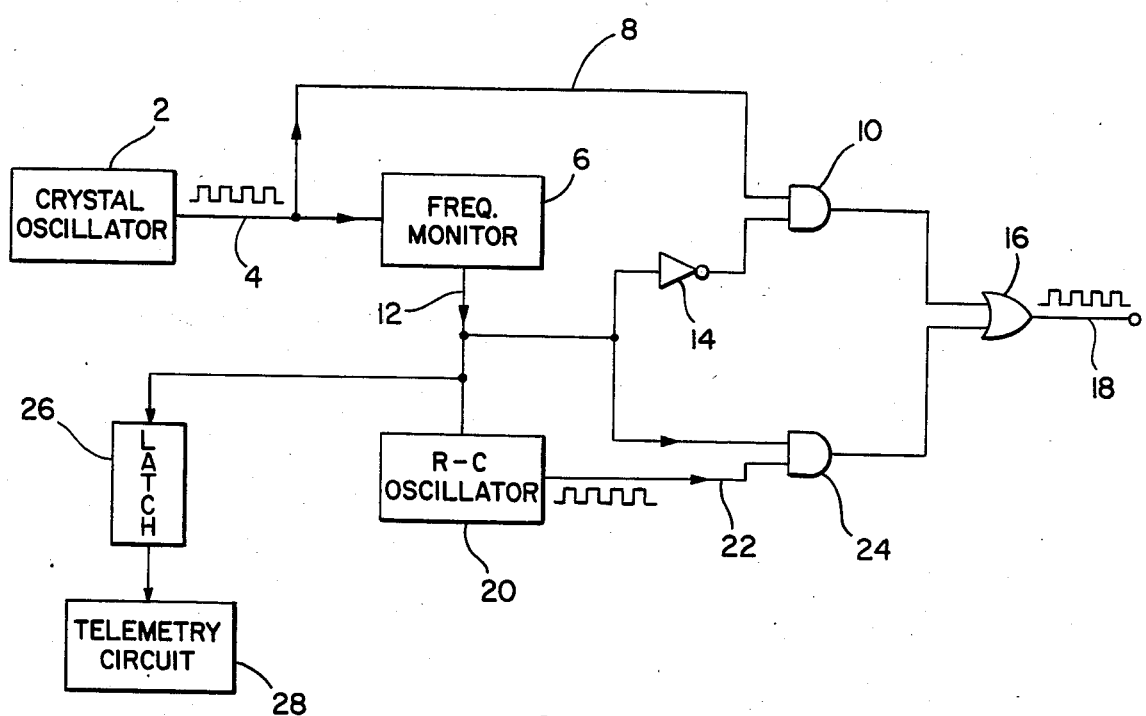
FIG. 1 is a block diagram of the clocking circuit of the present invention.

The clocking circuit of the present invention is depicted schematically in FIG. 1. A primary clocking source, comprising a crystal oscillator 2, provides periodic clocking pulses at a predetermined frequency over its output, line 4. By way of example, the output pulses of the crystal oscillator 2 could occur at a frequency of 6.4 kHz. Crystal oscillators that providing periodic clocking pulses as part of an overall electronic circuit are well-known in the art.

Figure 2:
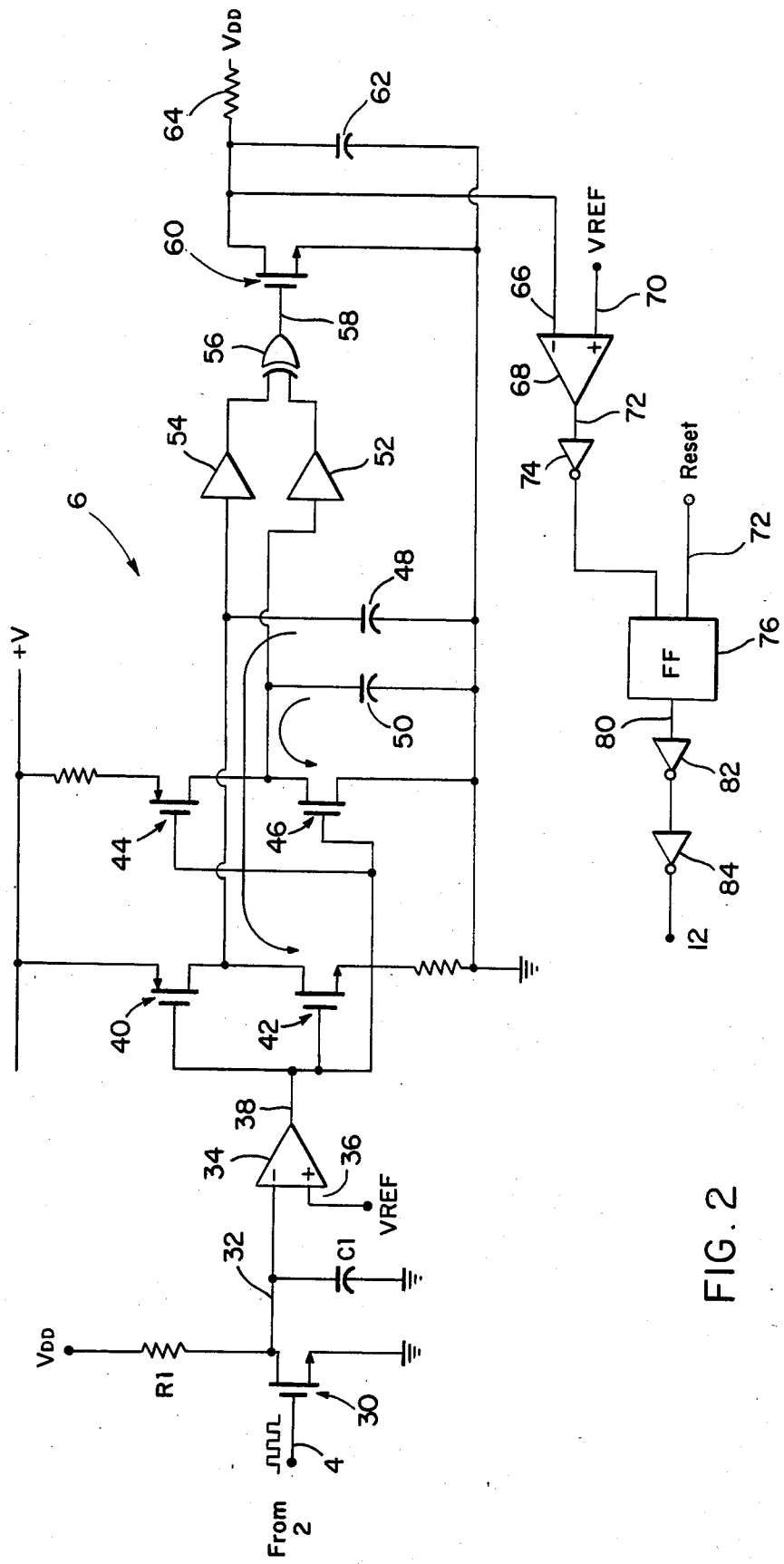
FIG. 2 is a diagram of the frequency monitoring circuit of the present invention.

The periodic clocking pulses from the crystal oscillator 2 are provided as an input to a fault detecting circuit such as a frequency monitoring circuit 6. The clocking pulses are also provided, via line 8, to the input of AND gate 10. The frequency monitoring circuit 6 is depicted in FIG. 2 and will be described hereinbelow.

The frequency monitoring circuit 6 monitors the periodic clock pulses from the crystal oscillator 2 and detects if the frequency ($f_c$) is at the predetermined frequency ($f_o$) of the crystal oscillator. If it is, a first control signal, at a low, or zero, state, is provided over the output line 12. If, on the other hand, the frequency of the crystal oscillator 2 is above or below the predetermined frequency, the frequency monitoring circuit 6 provides a second control signal, at a high, or one, state, over the output line 12.

The output 12 of the frequency monitoring circuit 6 is provided to an inverter 14, the output of which is connected to a second input of the AND gate 10. The output of the AND gate 10 is provided to an OR gate 16, having its output connected with a clock output terminal 18. The clock output terminal 18 may be connected to various portions of a typical electronic circuit (not shown) that requires periodic clocking or timing pulses.

It is thus seen that when the output 12 of the frequency monitoring circuit 6 is in a low state, indicative of a properly functioning crystal oscillator, the low signal is inverted by inverter 14 to provide a high input to AND gate 10. The AND gate 10 thus passes the clocking pulses provided from the crystal oscillator 2 over line 8 to the OR gate 16 which, in turn, passes these pulses to the clock output terminal 18. Thus, when the crystal oscillator 2 is properly functioning, the periodic clocking pulses of the oscillator are provided to the clock output terminal 18. If, however, the crystal oscillator 2 were malfunctioning, such that the output 12 of the frequency monitoring circuit 6 were in a high state, such high signal would be inverted by inverter 14 to a low state and the oscillator output (if any) would not pass through the AND gate 10. In essence, the oscillator 2 would be disconnected from the output terminal 18.

The output 12 of the frequency monitoring circuit is also provided to a back-up clocking source such as the RC oscillator 20. It should be apparent that other types of oscillators could be employed as the back-up source, such as a crystal oscillator. However, it is preferred that the oscillator 2 be of a different type from the oscillator 20 to minimize the risk of identical failures.

The RC oscillator 20 is enabled upon receipt of a high signal from the frequency monitor 6. That is, when the frequency monitoring circuit 6 detects that the periodic clocking pulses of the crystal oscillator 2 are not at the predetermined frequency, i.e. at a frequency above or below the predetermined frequency, the RC oscillator is enabled. The RC oscillator provides clocking pulses, over output 22, at the same predetermined frequency ($f_o$) as the crystal oscillator 2. The clocking pulses from RC oscillator 20 are provided, via line 22, to the input of AND gate 24, the output of which is coupled to the OR GATE 16.

The output 12 of the frequency monitoring circuit 6 is provided as a second input to the AND gate 24. Thus, when the frequency monitoring circuit 6 detects a fault condition in the crystal oscillator 2, so that the output of the frequency monitoring circuit 6 over line 12 is high, the AND gate 24 enables the periodic clock pulses from the RC oscillator 20 to pass to the OR gate 16. The pulses are provided through the OR gate 16 to clock output terminal 18.

The output 12 of the frequency monitoring circuit is also provided as an input to a latch circuit 26. When the output 12 goes to a high state, indicative of a malfunctioning crystal oscillator, the high signal is provided to, and latched by, the latch 26. The latch circuit 26 is coupled with a telemetry circuit 28 (depicted schematically) which provides a communication signal to an external detector (not shown). The telemetry circuit 28 is enabled by the high signal latched in the latch circuit 26. The circuit 28 may be any typical telemetry or communication circuit. A particular circuit that may be employed is disclosed in copending patent application Ser. No. 478,038, filed on Mar. 23, 1983.

As mentioned above, the frequency monitoring circuit 6 monitors the periodic clock pulses from crystal oscillator 2 and detects if the clock pulses devicate from a predetermined clocking frequency. If a deviation is detected, the output 12 of the frequency monitoring circuit goes to a high state from its normally low condition. Many types of frequency monitoring circuits may be employed. For example, the frequency monitoring circuit may be a frequency to voltage converter which converts the incoming pulse frequency to a voltage. This voltage is monitored and a high output is provided when the voltage changes. Such frequency to voltage converters are well-known in the art.

An exemplary form of the frequency monitoring circuit 6 is shown in FIG. 2. As depicted in FIG. 2 incoming periodic clocking pulses from the crystal oscillator 2, over line 4, are provided as an input. The output 12 of the frequency monitoring circuit 6 is in a low state when the periodic input clock pulses are at a predetermined frequency ($f_o$), or in a high state when the input clock frequency ($f_c$) deviates from the predetermined value. The frequency monitoring circuit 6, as shown in FIG. 2, operates as follows.

Periodic clocking pulses from the crystal oscillator 2 are provided over line 4 to periodically turn on a field-effect transistor (FET) 30. A series-connected RC circuit, composed of resistor R1 and capacitor C1, is coupled across a DC voltage source VDD, such that the turning on of the FET 30 causes the capacitor C1 to discharge across the drain and source electrodes of the FET 30. The capacitor C1 is connected to the negative input 32 of a comparator 34, the positive input 36 of which is coupled to a reference voltage VREF. When the reference voltage VREF exceeds the voltage across the capacitor C1, the comparator 34 output on line 38 is high; when the voltage across the capacitor C1 is greater than the reference voltage VREF, the comparator output on line 38 is low.

The voltage across the capacitor C1 is dependent upon the frequency of the clocking pulses applied to the gate of the FET 30. As the frequency of the clocking pulses increases, the FET 30 is turned on and off at a faster rate thus discharging the capacitor C1 faster. If the input frequency (f) is relatively low, the capacitor C1 discharges less frequently, thus allowing C1 to be charged to a higher voltage level. It should be recognized that by proper selection of the time constant R1-C1, and the reference voltage VREF, the voltage level at the input 32 of the comparator 34 can be correlated with the predetermined frequency to be monitored.

Figure 3:
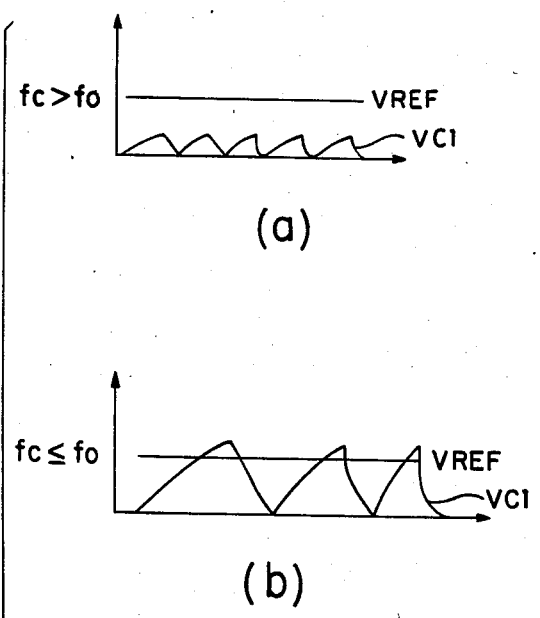
FIG. 3 is a diagram depicting voltage waveforms.

For example, reference should be made to FIGS. 3(a) and 3(b) which depict the comparison between the reference voltage VREF and the voltage across the capacitor VC1. The time constant R1-C1 is selected such that if the frequency of the clocking pulses ($f_c$) is greater than the predetermined frequency ($f_o$), the rapid periodic actuation of the FET 30 causes the capacitor C1 to discharge at a relatively fast rate thus preventing the capacitor C1 voltage (VC1) from exceeding the reference voltage VREF. If, on the other hand, the frequency of the input clocking pulses ($f_c$) is less than, or equal to, the predetermined frequency ($f_o$), the capacitor C1 discharges at a relatively lower rate, allowing the capacitor C1 voltage (VC1) to exceed the reference voltage (VREF).

Figure 4:
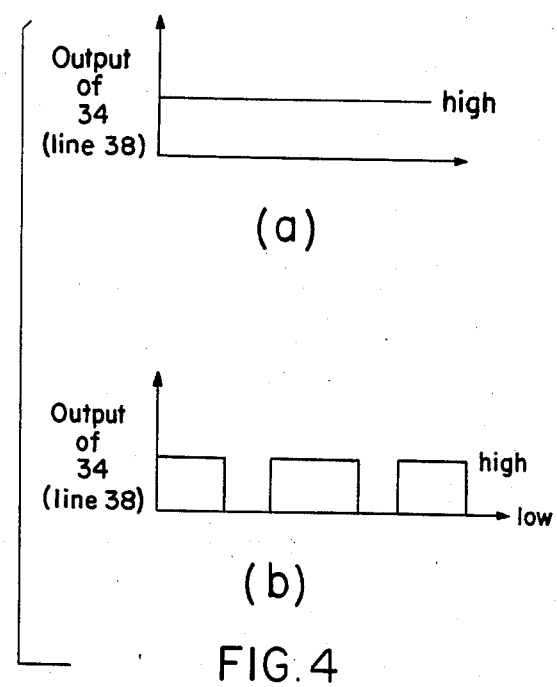
FIG. 4 is a diagram depicting output signals of the comparator shown in FIG. 2.

FIGS. 4(a) and 4(b) depict the output signals for the comparator 34 (at line 38) for the respective FIGS. 3(a) and 3(b). As shown in FIG. 4(a), the output of comparator 34 (over line 38) remains high, since the reference voltage always exceeds the capacitor C1 voltage (VC1). In FIG. 4(b), the output of the comparator 34 (over line 38) is periodically high and low.

The output 38 of comparator 34 is connected to the input gates of serially-connected P-type FET 40 and N-type FET 42. P-type FET 40 is a low impedance device whereas the N-type FET 42 has a high impedance. The P-type and N-type FETs 40, 42 are always in opposite states (on/off) depending on the status of line 38.

The output 38 of comparator 34 is similar connected to the input gates of serially-connected P-type FET 44 and N-type FET 46. In this instance, P-type FET 44 is selected as a high impedance device and N-type FET 46 has a low impedance. The FETs 44, 46 are similarly always in opposite states.

Connected across the high impedance FET 42 is a capacitor 48. Connected across the low impedance FET 46 is a capacitor 50. When FETs 42 and 46 are turned on, capacitors 48 and 50 discharge across the respective FETs (as indicated by the arrows shown in FIG. 2), but at different rates since the time constant in the discharge path through the high impedance FET 42 is different from the time constant in the path through low impedance FET 46.

Capacitor 50 is coupled, through buffer 52, to an input of exclusive OR gate 56. Capacitor 48 is coupled, through buffer 54 to the other input of exclusive OR gate 56. The exclusive OR gate 56 has the characteristic that, when both inputs are unequal, its output 58 is high.

FETs 42 and 46 are always in the same state; FETS 40 and 44 are similarly always in the same state (but opposite to FETS 42 and 46). Thus, it should be apparent that when the output 38 of comparator 34 is non-periodic (i.e., always high) indicative of the clocking frequency ($f_c$) exceeding the desired predetermined frequency ($f_o$), the voltages across the capacitors 48, 50 will provide the same inputs to exclusive OR gate 56, thus making the output over line 58 always in a low state. On the other hand, if the output 38 of the comparator 34 is periodic, indicative of the clocking frequency ($f_c$) being equal to or less than the predetermined frequency ($f_o$), then the capacitors 48, 50 will periodically charge and discharge at difference rates (due to the different time constants in their discharge paths) and thus providing unequal periodic inputs to the exclusive OR gate 56. In such instance the output over line 58 will be periodic high and low pulses.

Output line 58 gates a FET 60 to alternatively turn the FET 60 on or off. When line 58 is high, FET 60 is turned on; when line 58 is low, FET 60 is turned off (or open). Capacitor 62 is connected across the drain and source gates of the FET 60 and is charged by a voltage source VDD through resistor 64. The voltage across the capacitor 62 is coupled with the negative input 66 of a comparator 68, the positive input 70 being connected to a reference voltage VREF. When the FET 60 is turned on, the capacitor 62 discharges through the FET 60, thus lowering the voltage to the input 66 of the comparator 68.

The output 72 of the comparator 68 is inverted by inverter 74. The output of the inverter 74 is connected with a flip-flop, or latch, 76, to turn the flip-flop on, to a high state, upon receipt of a high signal from the inverter 74. The flip-flop 76 has a reset line 78 for resetting the flip-flop 76. The flip-flop output 80 passes through a pair of inverters 82, 84 to the output line 12. The state (high or low) of the output line 12 is the same as the state of the flip-flop output 80.

Thus, if the frequency of the oscillator clocking pulses ($f_c$) exceeds the predetermined frequency ($f_o$) such that the output 58 of the exclusive OR gate 56 is always low, the FET 60 is off (open) and the capacitor 62 remains charged to voltage level exceeding the reference voltage VREF. The output 72 of the comparator 68 is thus low, which provides a high input to the flip-flop 76, which, in turn provides a high signal to the output line 12.

If, on the other hand, the frequency of the oscillator clocking pulses ($f_c$) is equal to or below the predetermined frequency ($f_o$), such that the output 58 of the exclusive OR gate 56 is periodic, the FET 60 is periodically on and off. The capacitor 62 discharges through the FET 60 when the latter is on. The capacitor 62 will thus periodically charge and discharge at a rate dependent on the time constant of capacitor 62 and resistor 64. By selectively adjusting this time constant, it can be ensured that if the periodic frequency ($f_c$) is equal to the predetermined frequency ($f_o$), then the capacitor 62 will discharge before its voltage exceeds the predetermined voltage VREF. Thus the comparator output 72 will remain high and the flip-flop 76 will not be set. Thus the output line 12 remains in a low state. If, on the other hand, the periodic input frequency ($f_c$) is less than the predetermined frequency ($f_o$), this low frequency permits the capacitor 62 to charge up so that its voltage exceeds the reference voltage VREF. Thus the comparator output 72 will have at least one low output pulse which will set the flip-flop 76 and place the output line 12 in a high state, where it will remain until the flip-flop 76 is reset.

Above a preferred embodiment of the present invention is disclosed. It should be appreciated, however, that the present invention is not limited to the specific embodiment disclosed herein, but solely with reference to the following claims.

What is claimed is:

1. A clocking circuit for providing periodic clock signals in an electronic circuit comprising:

oscillator means for providing a first periodic clock signal at a predetermined frequency;

back-up oscillator means for providing a second periodic clock signal at said predetermined frequency;

fault detecting means for monitoring the first periodic clock signal of said oscillator means and for coupling said oscillator means with a clock output terminal when the first periodic clock signal is at said predetermined frequency, and for coupling said back-up oscillator means to said clock output terminal when the first periodic clock signal is not at said predetermined frequency, said fault detecting means including frequency monitoring means for monitoring the frequency of said first periodic clock signal and for providing a first control signal if said first periodic clock signal is at said predetermined frequency, and for providing a second control signal if said first periodic clock signal is above or below said predetermined frequency, and logic means coupled with said frequency monitoring means and said clock output terminal for coupling said first periodic clock signal with said clock output terminal upon receipt of said first control signal, and for coupling said second periodic clock signal with said clock output terminal upon receipt of said second control signal; and a clock output terminal for selectively receiving one of said first and second periodic clock signals as determined by said fault detecting means.

2. The clocking circuit as claimed in claim 1 wherein said back-up oscillator means is connected with said frequency monitoring means and wherein said second control signal enables said back-up oscillator means.

3. The clocking circuit as claimed in claim 1 wherein said oscillator means comprises a crystal oscillator, and wherein said back-up oscillator means comprises an RC-oscillator.

4. The clocking circuit as claimed in claim 1 further comprising signaling means for providing a communication output signal in response to said second control signal.

5. The clocking circuit as claimed in claim 1 wherein said frequency monitoring means comprises a first capacitor, means for charging and discharging said first capacitor at a rate proportional to the frequency of said first periodic clock signal and for providing said second control signal so long as said first capacitor discharges prior to reaching a first reference voltage.

6. The clocking circuit as claimed in claim 5 wherein said frequency monitoring means comprises a second capacitor, means for charging and discharging said second capacitor at a rate proportional to the charging and discharging of said first capacitor so long as said first capacitor exceeds the first reference voltage, and means for providing said second control signal when the second capacitor charges to a voltage in excess of a second reference voltage.

7. A frequency monitoring system for monitoring the clocking signals of an oscillator clock source and for providing a fault signal when the frequency of the clocking signals deviates from its predetermined frequency, the system comprising:

input means for receiving clocking signals;

means for charging and discharging a first capacitor at a frequency proportional to the frequency of the clocking signals;

first comparator means for comparing the voltage across said first capacitor with a first reference voltage and for providing a first comparator output signal having a frequency proportional to the voltage transitions about the first reference voltage;

means for charging and discharging a second capacitor at a frequency proportional to the frequency of the first comparator output signal;

second comparator means for comparing the voltage across said second capacitor with a second reference voltage and for providing a second comparator output signal having a first state when the voltage across the second capacitor remains below the second reference voltage, and having a second state when the voltage across the second capacitor exceeds the second reference voltage;

output means for receiving said second comparator output signal and for issuing a fault signal when the second comparator output signal is in said second state.

* * * * *